T. E. TURNER & O. J. HEATH.
HAY BALING PRESS.
APPLICATION FILED FEB. 15, 1912.
1,029,156.
Patented June 11, 1912.
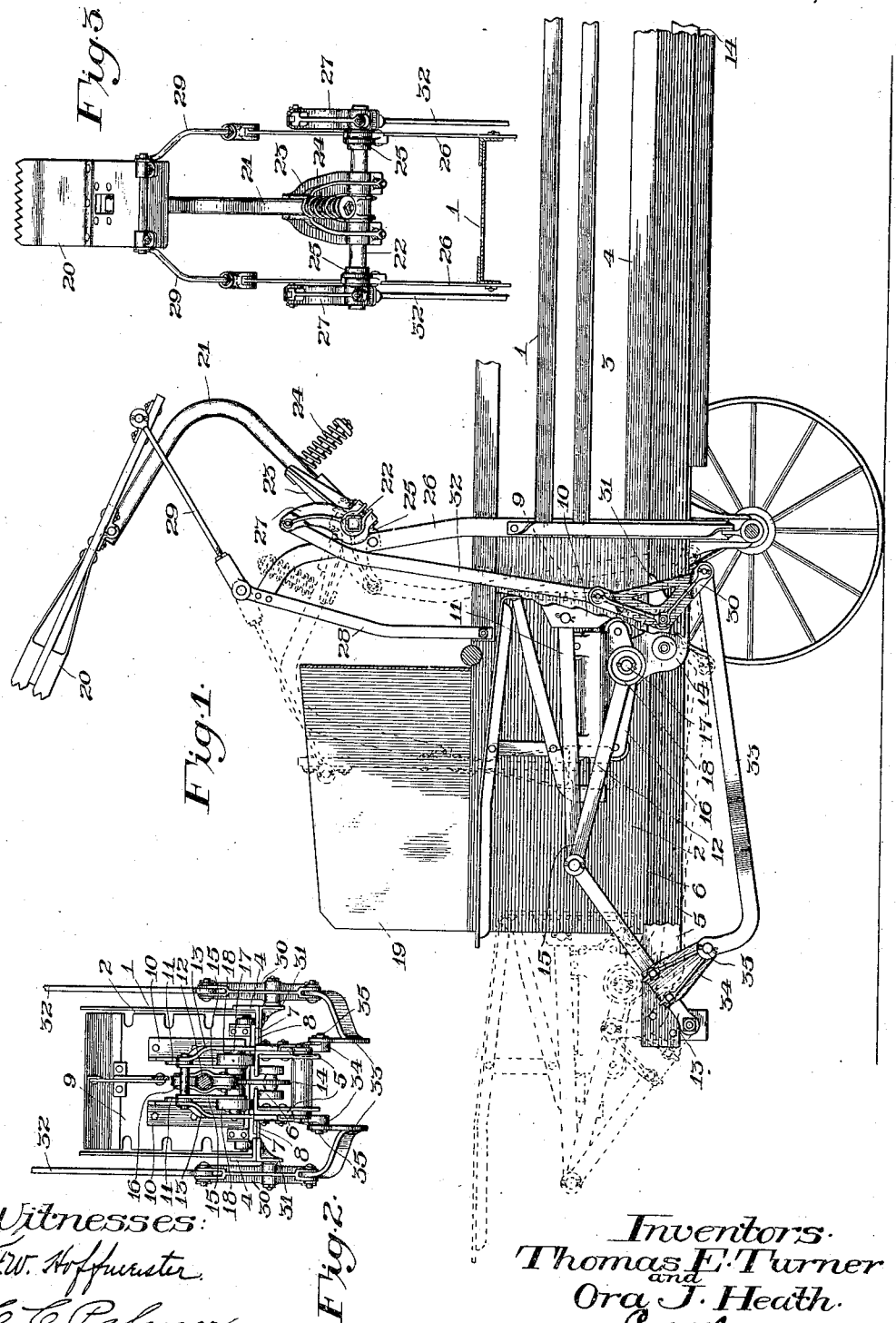

UNITED STATES PATENT OFFICE.

THOMAS E. TURNER AND ORA J. HEATH, OF SPRINGFIELD, OHIO, ASSIGNORS TO INTERNATIONAL HARVESTER COMPANY, A CORPORATION OF NEW JERSEY.

HAY-BALING PRESS.

1,029,156.  Specification of Letters Patent.  Patented June 11, 1912.

Application filed February 15, 1912. Serial No. 677,807.

*To all whom it may concern:*

Be it known that we, THOMAS E. TURNER and ORA J. HEATH, citizens of the United States, residing at Springfield, in the county of Clark and State of Ohio, have invented certain new and useful Improvements in Hay-Baling Presses, of which the following is a specification.

Our invention relates to baling presses having reciprocating plungers and swinging feeders, and in particular to means whereby the feeder is actuated by means of a connection between the plunger actuating mechanism and the self-feeder mechanism; the object of our invention being to provide a construction simple and strong in its parts and positive and efficient in operation. These objects are attained by means of the mechanism illustrated by the accompanying drawings, in which—

Figure 1 represents a side elevation of a baling press having our invention embodied in its construction; Fig. 2 is a rear end elevation of part of Fig. 1; and Fig. 3 is a front elevation of part of Fig. 1 designed to illustrate the manner of mounting part of the self-feeder mechanism upon the frame of the structure.

Like reference characters designate the same parts throughout the several views.

Our invention is adapted for use in connection with a plunger actuating mechanism such as is shown in Patent No. 836,653, November 20, 1906, Frank A. Ryther, and 1 represents the frame of the baler, 2 the compresssion chamber at the rear end thereof, and 3 the baling chamber. The bottom of the frame is formed of the corner angle bars 4, the centrally arranged inverted opposing angle bars 5 spaced apart in a manner forming an inverted channel with a slot 6 in the bottom thereof, a plate 7, and angle bars 8, which support and secure together the bars 4 and 5.

The plunger head consists of the single plate 9, having a pair of bracket members 10 secured to the center thereof, the bracket members being spaced apart in a manner to receive between them one end of a plunger bar 11 that is pivotally connected therewith, and near the bottom of the plunger head, and directly beneath the bar 11, is secured a rearwardly projecting stem 12. The opposite end of the plunger bar 11 is pivotally connected with one end of oppositely disposed toggle bars 13, having the opposite ends thereof pivotally connected with the rear end of the frame of the machine, constituting a toggle connection between the baler frame and the plunger head. A plunger draw bar 14 extends forwardly beneath the baler frame and has one end thereof connected with the toggle joint formed by the bar 11 and the toggle bars 13 by means of oppositely disposed links 15. The rear end of the draw bar is secured to a guide block 16, which is provided with a longitudinally arranged bore adapted to slidably receive the stem 12 of the plunger head. The pin 17, that secures the draw bar to the guide block, is preferably made to constitute the pivotal axis of rollers 18 as well as the pivotal axis between the end of the draw bar and the links 15. The rollers 18 move along the upper side of the bars 5 and support the plunger head.

19 represents the feed hopper communicating with the compression chamber, and 20 a swinging feeder head that is pivotally connected intermediate the ends thereof to one end of a curved arm 21, the opposite end of said curved arm being yieldingly connected with a rock shaft 22 by means of a bracket member 23 and a compression spring 24 in a well-known way, whereby the feeder arm may yield when meeting an obstruction in the compression chamber. The rock shaft is journaled in bearings 25 secured to vertically arranged members 26 secured to opposite sides of the baling chamber, and 27 represents lever arms secured to opposite ends of said rock shaft. The members 26 extend beyond the bearings 25 and curving rearward have the upper ends thereof secured to the upper ends of brace members 28, the lower ends of said brace members being secured to the frame of the machine, and 29 represents links having one end thereof pivotally connected with the upper ends of members 28 and the opposite ends thereof with the feeder head 20 whereby the position of the latter is controlled as it enters the compression chamber.

30 represents bell crank levers pivotally mounted upon bracket members 31 secured to the bed frame of the machine upon opposite sides thereof and having one arm thereof connected with the lever arms 27 by means of links 32, and the remaining arms thereof connected with the front ends of longitudinally arranged bars 33.

34 represents bracket members secured to the lower ends of the toggle bars 13 adjacent the pivotal connection thereof with the frame of the machine, upon opposite sides thereof, the bracket members being provided with laterally projecting studs 35 whereby said brackets are pivotally connected with the rear upturned ends of the bars 33.

In operation, as the draw bar pulls forward upon the toggle bars 13, causing them to swing upward and forward in a direction to cause the plunger head to traverse the compression chamber, motion is transmitted to the bell crank levers by means of the bars 33 and bracket members 34 in a direction to rock the shaft 22 forward and raise the feeder head to the position shown by full lines in Fig. 1. When the plunger head is moved in an opposite direction, the rock shaft is turned in a direction to cause the feeder head to pass downward through the feed hopper and into the compression chamber.

What we claim as our invention, and desire to secure by Letters Patent, is:

A baling press having, in combination, a feed hopper, a compression chamber, a plunger head, a draw bar, means whereby said draw bar is operatively connected with said plunger head, said means including toggle bars pivotally connected with the frame of the machine and upon opposite sides thereof, a swinging feeder head adapted to be moved into and from said compression chamber, means for actuating said feeder head, said means including a transversely arranged rock shaft journaled in bearings carried by the frame of the machine and having lever arms secured to opposite ends thereof, bell crank levers pivotally mounted upon the frame of the machine and having one arm thereof connected with said lever arms by means of links, bracket members secured to said toggle bars, and bars pivotally connecting said bracket members with the remaining arms of said bell crank levers.

THOMAS E. TURNER.
ORA J. HEATH.

Witnesses:
R. M. HALLENBECK,
H. GUYTON.

---

Copies of this patent may be obtained for five cents each, by addressing the "Commissioner of Patents, Washington, D. C."